No. 613,635. Patented Nov. 1, 1898.
M. C. LISLE.
MACHINE FOR APPLYING JACKETS TO PROJECTILES.
(Application filed June 5, 1897. Renewed Mar. 30, 1898.)
(No Model.) 3 Sheets—Sheet 3.
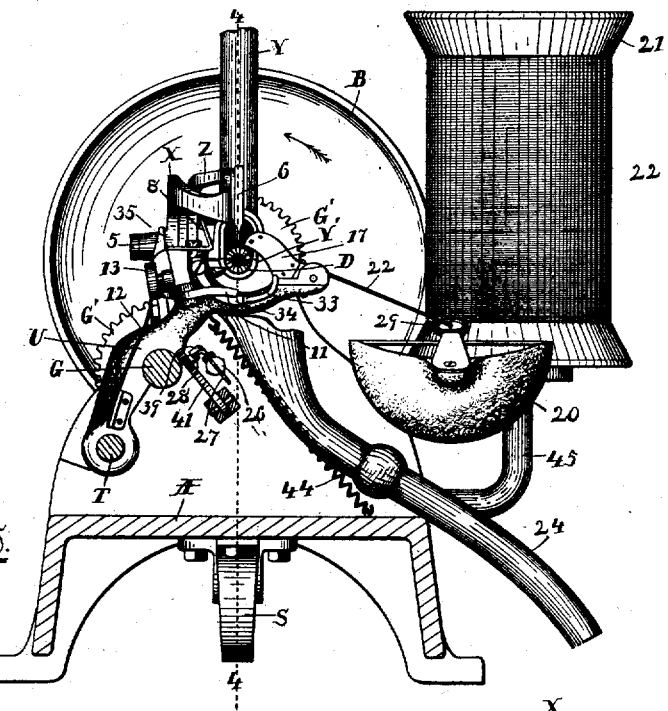
Fig.5.
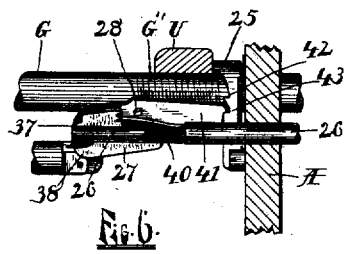
Fig.6.
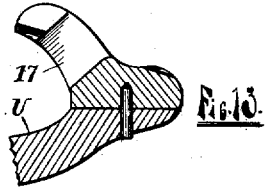
Fig.13.
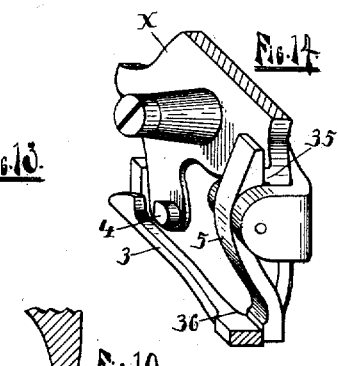
Fig.14.
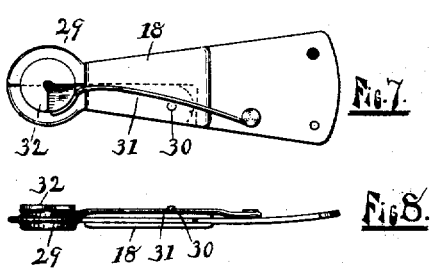
Fig.7.
Fig.8.
Fig.9. Fig.10.
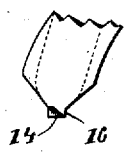 
Fig.11. Fig.12.
WITNESSES: George Hollway Ella B. Hood.
INVENTOR: Myron C. Lisle.
BY Moulton & Flanders
Attorneys.

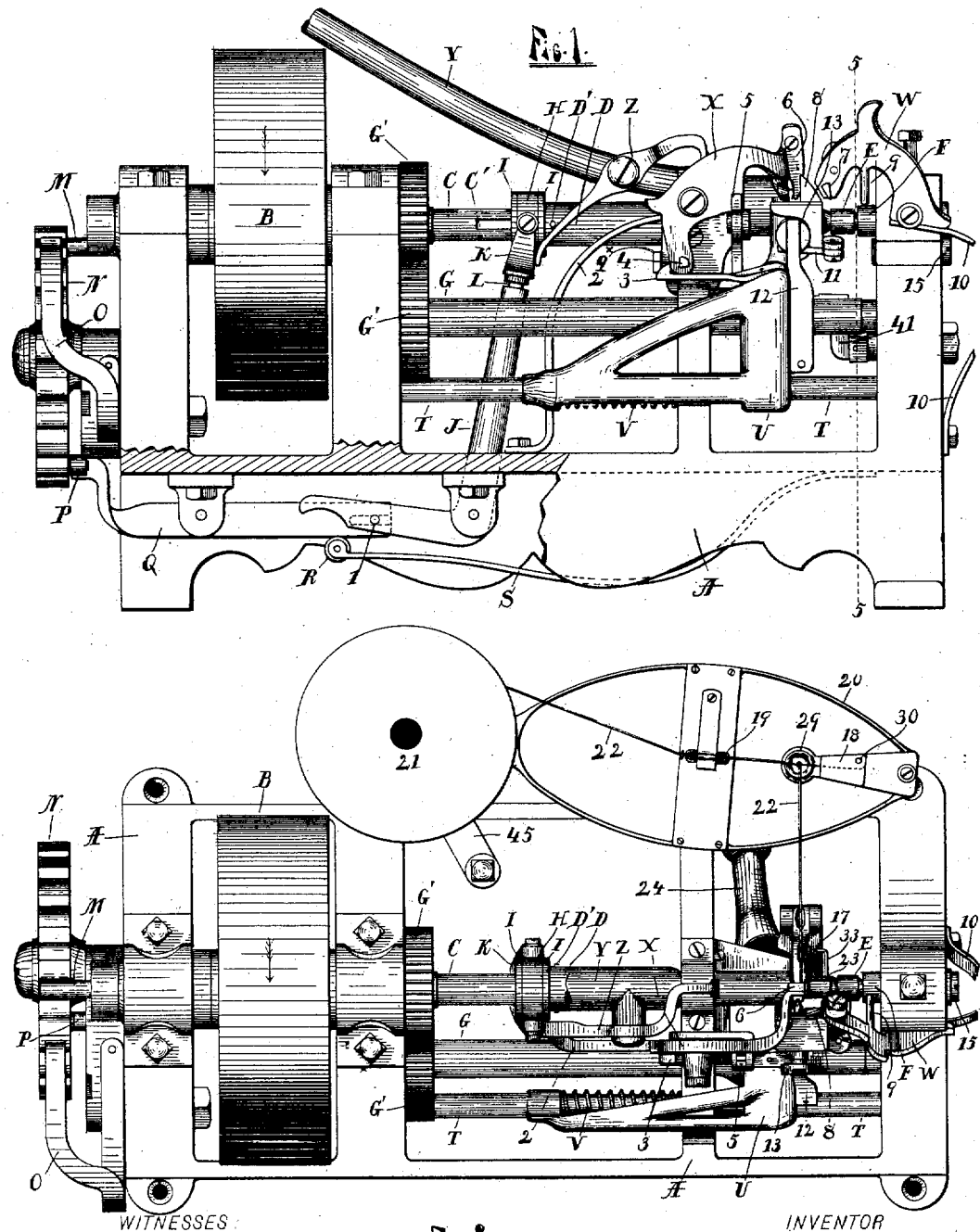

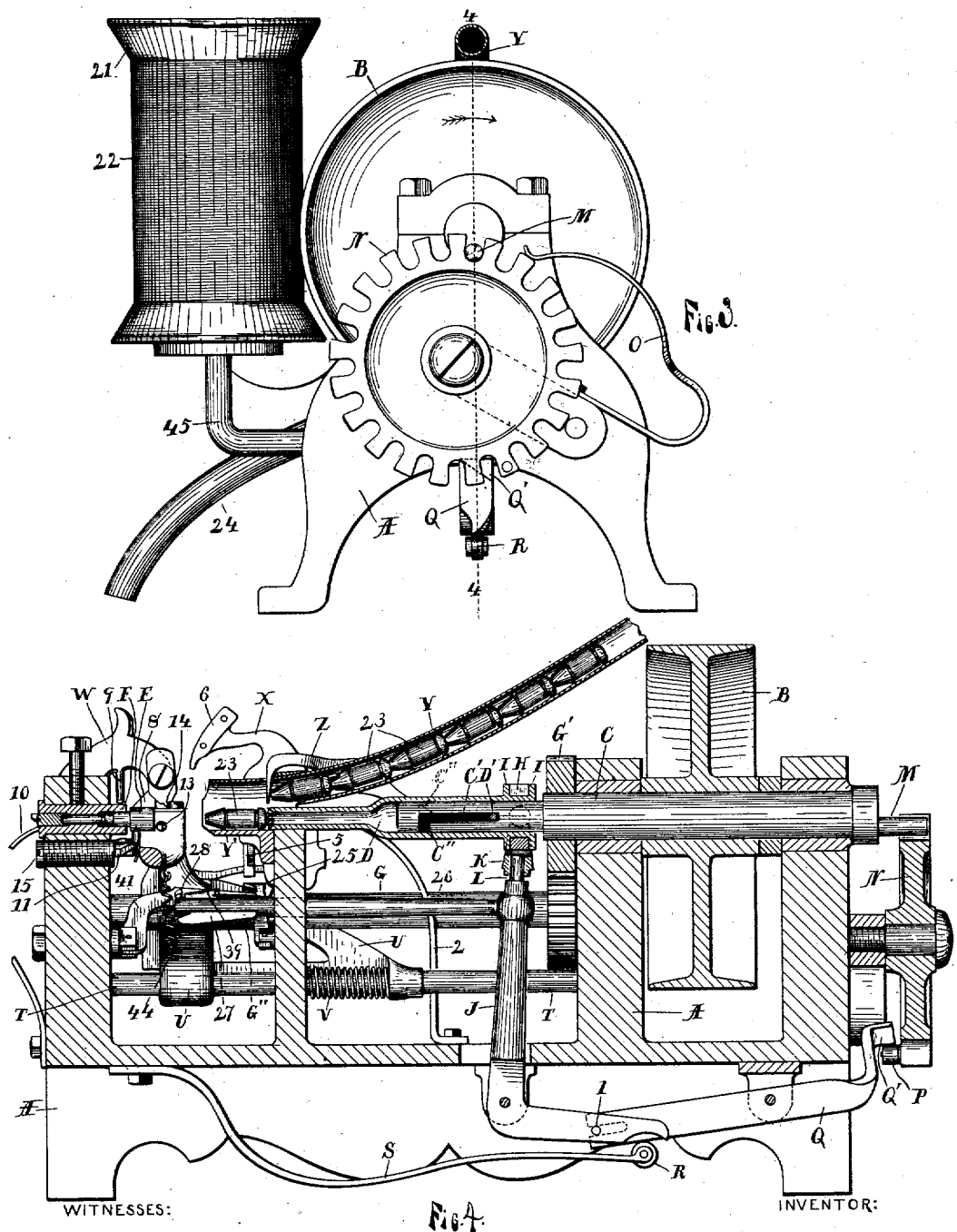

UNITED STATES PATENT OFFICE.

MYRON C. LISLE, OF GRAND RAPIDS, MICHIGAN, ASSIGNOR, BY DIRECT AND MESNE ASSIGNMENTS, TO THE NATIONAL PROJECTILE WORKS, OF SAME PLACE.

MACHINE FOR APPLYING JACKETS TO PROJECTILES.

SPECIFICATION forming part of Letters Patent No. 613,635, dated November 1, 1898.

Application filed June 5, 1897. Renewed March 30, 1898. Serial No. 675,804. (No model.)

*To all whom it may concern:*

Be it known that I, MYRON C. LISLE, a citizen of the United States, residing at Grand Rapids, in the county of Kent and State of Michigan, have invented certain new and useful Improvements in Machines for Applying Jackets to Projectiles; and I do hereby declare the following to be a full, clear, and exact description of the invention, such as will enable others skilled in the art to which it appertains to make and use the same.

My invention relates to improvements in machines for applying jackets to projectiles, and more especially to jackets made of small twine wound spirally and applied to projectiles for small-arms, said projectiles being made of lead or other soft metal; and its object is to provide a machine that will operate automatically and provided with certain new and useful features hereinafter more fully described, and particularly pointed out in the claims, reference being had to the accompanying drawings, in which—

Figure 1 is a side elevation of a device embodying my invention with a part of the frame broken away; Fig. 2, a plan view of the same; Fig. 3, an end elevation of the same; Fig. 4, a longitudinal vertical section on the line 4 4 of Figs. 3 and 5; Fig. 5, a vertical section on the line 5 5 of Fig. 1; Fig. 6, a detail of the trip mechanism of the carriage; Figs. 7 and 8, enlarged details of the twine-guide; Figs. 9 and 10, enlarged details of the end of the hammer for fastening the end of the twine; Figs. 11 and 12, enlarged details of the end of the hammer for cutting and fastening the end of the twine; Fig. 13, an enlarged detail of the beak-pivot, and Fig. 14 an enlarged detail of the hammer-operating mechanism.

Like letters and numbers refer to like parts in all of the figures.

A represents any suitable frame to support the various operative parts.

B is the driving-pulley; C, the driving-shaft, having a longitudinal slot C', terminating near the end of the shaft in lateral extensions C'', having faces inclined toward the end of the shaft. Surrounding the inner end of the driving-shaft is a longitudinally-movable tubular spindle D, having a pin D' traversing the slot C' and engaging the lateral extensions C'' of said slot. Said spindle extends beyond the end of the driving-shaft and is reduced and journaled in the frame A and terminates in a corrugated socket to engage and rotate the projectile 23. Said spindle is reciprocated upon the driving-shaft by means of a bell-crank lever J, having a telescopic extension L, terminating in a fork K, pivoted to opposite sides of a ring H, rotative between flanges I on the spindle. A pivoted lever Q has a forked end engaging a pin I in the horizontal arm of the bell-crank J, and the outer end of said lever is provided with an incline Q', engaged by a stud P on the notched wheel N, operated by a crank-pin M on the driving-shaft C and yieldingly held from turning by the spring O. A spring S, having a roll R engaging the levers J and Q, presses said levers upward and forces the spindle against the end of the projectile 23. The opposite end of said projectile is engaged by a rotative socket E, journaled in a bearing F, longitudinally adjustable in the frame A. Above the spindle and driving-shaft is an inclined feed-tube Y to convey the projectiles and having a downward and lateral extension Y' below its lower end to receive the projectiles in succession.

Z is a pivoted lever having one end turned downward and extending through an opening in the top of the tube Y to stop the column of projectiles in the tube and having its opposite end engaged and depressed by the yoke K to release said projectiles and allow them to move forward. A spool 21 is journaled on a suitable support 45, on which spool is wound the twine 22 of which the jackets are formed. An oil-reservoir 20 is provided, having an oiling-wick 19, over which wick the twine 22 passes on its way to the guide-arm 18. Said arm has a head 29, provided with a central opening somewhat smaller than the twine, through which opening said twine passes. To permit the twine and knots or other enlarged parts of the same to pass through said opening and at the same time maintain frictional contact with the same, the end of said arm and the head thereof are divided longitudinally into two parts and the detached part pivoted to the other, as at 30, and a spring 31 is also provided to press the parts of the head together. A hook 32 on the under side of the fixed part of the head engages the twine and keeps it in the central opening of the head. A countershaft G is provided and connected to rotate in unison with the driving-shaft C by means of gears G' and provided with a screw-thread G'' to engage a half-nut in a carriage U, longitudinally movable on the rod T and also rotative thereon. Said carriage is moved forward by said screw-thread and held in engagement therewith by a spring 44 and is moved backward by means of a spring V, surrounding the rod T and engaging the frame at one end and the carriage at the other end. Longitudinally movable in an opening in said carriage is a thread-cutting tool 13, pressed toward the projectile by a spring 12 and away from the same by a lever 11 when said lever engages an adjustable stop 15. On the carriage U is also a beak 17, divided vertically and grooved in its adjacent faces, through which grooves the twine 22 passes to the projectile. Said beak is pivoted to turn horizontally, as shown in Fig. 13, and is provided with an arm 33, engaged by a spring 34, whereby the beak is turned toward the extension Y' and yieldingly engages the same to the extent of about one revolution of the screw as the carriage is moved back to the beginning of its traverse.

Pivoted upon the frame is a hammer X, having its head above the rear end of the projectile 23 and provided with a head 6, having a cupped end and concave edges at two sides of the cup, as shown in Figs. 9 and 10, and the other end of said hammer extends downward and is provided with a lug 4 to engage a hook 3, attached to the carriage U. A spring 2 engages said hammer and holds it yieldingly and normally with the end of the head 6 a short distance from the projectile. Said hammer is also provided with a shoulder 35 to engage the end of a pivoted dog 5, the other end of which dog is engaged by a projection 36 on the side of the hook 3 to release said dog and let the hammer X fall. A stop engages the hammer and prevents it from striking too forcibly. W is another hammer to operate near the other end of the projectile, being pivoted to the frame and provided with a head terminating in a cutting-tool 14 and a chisel-face 16 at right angles thereto. Said hammer is yieldingly held by a spring 10 normally with the head thereof close to the projectile and is provided with a stop 9 to limit its movement. A lug 7 on said hammer engages the inclined side of a triangular plate 8 on the carriage U to raise and release said hammer.

Connected at one end to the arm of the lever J, that reciprocates the spindle D, is a rod 26, arranged to move longitudinally in the frame and having near its other end a plate 27, pivoted at one end in a longitudinal slot in said rod and laterally movable therein, being limited in said movement by lugs 37 and 38. Said plate is yieldingly held with the rod by the lug 37 engaging the rod by a spring 40, and is provided with an inclined flange 39 to engage a lug 28 on an arm 41, said arm being pivoted to the frame and engaging a spring-actuated latch 25. Said latch is provided with a shoulder 42 to hold said arm when raised and a shoulder 43 to hold the same when lowered.

24 is a tube through which the projectiles are discharged from the machine.

The operation of my device is as follows: The projectiles to be jacketed are fed point forward in succession into the tube Y and by gravity move forward until the first one in the series is at the end of the said tube and resting on the spindle D. When the spindle D is retracted from the socket E, the first projectile falls into the extension Y' and the others are held back by the lever Z. Upon the release of the lever Q the spring S drives the spindle D suddenly forward, catching the first projectile between the socket E and the spindle and embedding the corrugations in the end of the spindle into the projectile to turn the same. The inclines C'' force the spindle forward by engaging the pin D', and thus prevent slipping of the corrugations on the projectile. The yoke K now raises the lever Z and permits the projectiles to move forward to the end of the tube, as before. Simultaneously with the forward movement of the spindle the rod 26 moves in the same direction and the inclined flange 39 runs under the lug 28 and raises the arm 41 into engagement with the shoulder 42. This throws the carriage out of engagement with the thread on the shaft G and allows it to run back on the arm 41 to starting position. The carriage then strikes against the latch 25 and releases the end of the arm 41, which arm drops to the shoulder 43, and the spring 44 reëngages the half-nut of the carriage U with the thread on the shaft G. This movement also brings the end of the twine which projects from the beak 17 within the rear groove of the projectile, and at the same time the shoulder 36 releases the dog 5 and allows the hammer X to fall, and the cupped end of the head 6 strikes the metal down over the twine and secures the same firmly within said groove. During the first revolution the beak turns on its pivot, and thus the twine is laid once round within the groove of the projectile. The thread-tool 13 traverses in advance of the twine and cuts a spiral groove for the same, and as it reaches the forward groove said tool is drawn back by the lever 11. The flange on the projectile also keeps the twine from winding beyond the groove until it is properly laid therein. The lug 7 now slips over the angle of the plate 8 and allows the hammer W to fall, the tool 14 severing the twine at the proper distance from the end of the beak and the inclined chisel-face 16 turning a portion of the flange on the projectile down upon the end of the twine wound on the projectile and securing the same. The crank-pin M imparts an intermittent motion to the wheel N as said pin engages the recesses in the rim of the same, which recesses are of such number that the stud P comes around and engages the incline Q' soon after the twine is severed and fastened, as described. This lifts the outer end of the lever Q and retracts the spindle D, thus releasing the projectile, which falls into and escapes through the tube 24. The wheel N stops in this position during the major portion of a revolution of the shaft, which gives time for the projectile to get fully out of the way of the next one before the latter is driven forward by the spindle upon the next movement of said wheel. The rod 26 simultaneously moves in the same direction as the spindle. The inclined flange 39, being highest at the rear, now runs over the lug 28 and raises the plate 27. As the carriage moves forward the hook 3 engages the lug 4 and raises the hammer X, which is then held by the dog 5, while the carriage returns to starting position, being released, as heretofore described.

Having thus fully described my invention, what I claim, and wish to secure by Letters Patent, is—

1. The combination of an inclined tube having a substantially horizontal end, a downward lateral extension at the lower end of said tube and having its axis parallel to the axis of said lower end, a rotative and longitudinally-movable spindle in the axis of said extension, and having its end traversing the same, a rotative socket in line with the axis of said spindle and mechanism to operate said spindle, substantially as described.

2. The combination of an inclined tube, having a substantially horizontal lower end and an opening in its side between said end and the inclined portion, a pivoted lever extending through said opening and within said tube, a lateral extension below the lower end of said tube and having its axis in line therewith, a rotative spindle traversing said extension and in the axis thereof, a rotative socket in line with said spindle, and means for operating said spindle and lever, substantially as described.

3. The combination of a driving-shaft, a spindle longitudinally movable on said shaft and rotative therewith, a bell-crank connected to said spindle to reciprocate the same, a spring engaging said bell-crank, a crank-pin on the driving-shaft, a notched wheel moved by said crank-pin, and a stud on said wheel to operate said bell-crank, substantially as described.

4. The combination of a driving-shaft having a crank-pin and longitudinal slot, a hollow spindle having a pin passing through said slot, and a reduced and cupped end, a rotative socket opposite said spindle, collars on said spindle, a ring rotative between said collars, a yoke pivoted to said ring, a bell-crank having an arm connected to said yoke, a spring and pivoted lever engaging the other arm of said bell-crank, a notched wheel operated by the crank-pin and having a stud engaging and operating the pivoted lever, substantially as described.

5. The combination of an inclined tube having a lateral extension and an opening, a pivoted lever having one end in said opening, a shaft having a crank-pin and a longitudinal slot, a hollow spindle having a reduced and cupped end and collars, and a pin traversing said slot, a ring rotative between said collars, a yoke pivoted to said ring, a bell-crank lever, a telescopic extension attached to said yoke, a spring and pivoted lever engaging said bell-crank lever, an inclined end on said pivoted lever, a notched wheel intermittently rotated by the crank-pin, a stud on said wheel engaging said inclined end of the lever, a spring-stop engaging said notched wheel, and a rotative socket opposite the end of the spindle, substantially as described.

6. The combination with a rotative socket, and a hollow rotative spindle having a cupped and corrugated end and a transverse pin, of a driving-shaft within said spindle having a longitudinal slot terminating in opposite lateral extensions having inclined sides to engage said pin whereby said spindle is both rotated and pressed toward the socket by the rotation of the spindle, substantially as described.

7. In combination with means for rotating a projectile and a reciprocating carriage having a twine-feeding beak, a hammer having a cupped end to strike the projectile and secure the twine in a groove in the same, and means for operating said hammer, substantially as described.

8. In combination with means for rotating a projectile, and a reciprocating carriage having a twine-feeding beak, a spring-actuated hammer to strike the projectile and secure the end of the twine thereto, a lug and shoulder on said hammer, a dog engaging said shoulder, a hook on the carriage engaging said lug, and a projection to engage the dog, substantially as described.

9. In combination with means for rotating a projectile and a reciprocating carriage having a twine-feeding beak, a hammer having a cupped end and striking the projectile at the rear to secure the twine, and a hammer having a cutting-tool to sever the twine and a chisel-face to secure the end thereof and striking the projectile near the forward end, and mechanism to operate said hammers, substantially as described.

10. In combination with means for rotating a projectile and a reciprocating carriage having a twine-feeding beak, a spring-actuated hammer having a cutting-tool to sever the twine and a chisel-face to secure the same, a lug on said hammer, and a triangular plate on said carriage engaging said lug, substantially as described.

11. In combination with means for rotating a projectile, a reciprocating carriage having a twine-feeding beak, a triangular plate and a hook having a lateral projection; a hammer having a cupped end, a shoulder, a lug, and a dog engaging said shoulder; a hammer having a cutting-tool and chisel-face, and a lug engaged by the triangular plate, substantially as described.

12. In combination with means for rotating a projectile, a reciprocating carriage, a twine-feeding beak, a hammer having a shoulder and a lug, a dog engaging said shoulder, a hook on the carriage engaging the lug and having a projection engaging the dog, a second hammer having a lug, and a triangular plate on the carriage engaging said lug, substantially as described.

13. The combination of a rotative spindle having a corrugated and cupped end, a rotative socket, a reciprocating carriage, a twine-feeding beak on said carriage, a spring-actuated hammer for securing the twine to the projectile and a second hammer for securing and cutting said twine and means for operating said hammers, attached to said carriage, substantially as described.

14. In combination with means for rotating a projectile and winding and securing twine thereon; a carriage and a thread-cutting tool attached to said carriage to form a spiral groove in said projectile to receive the twine, substantially as described.

15. In combination with means for rotating a projectile and mechanism for winding and securing twine upon the same, a carriage operating said mechanism, a thread-cutting tool movable on said carriage, a spring engaging said tool a lever engaging the same, and an adjustable stop to engage said lever, substantially as described.

16. In combination with means for rotating a projectile and securing the ends of twine thereto and means for severing said twine, a twine-feeding beak movably mounted on a carriage and moving oppositely to said carriage during the first revolution of the projectile, substantially as described.

17. In combination with means for rotating a projectile and securing the ends of twine thereto, and means for severing said twine, a reciprocating carriage, a twine-feeding beak pivotally mounted on said carriage, and a spring to turn said beak on its pivot during the first revolution of the projectile, whereby the twine is laid in a groove around the projectile, substantially as described.

18. In combination with a longitudinally-movable spindle having a cupped and corrugated end, and a rotative socket, a carriage, a twine-feeding beak pivotally mounted on said carriage, a thread-cutting tool movable on said carriage, a spring and lever to move said tool, a spring-actuated hammer having a cupped end, a lug, a shoulder, and a stop; a pivoted dog to engage said shoulder, a hook on the carriage engaging the lug and having a projection engaging the dog, a second spring-actuated hammer having a cutting-tool, a chisel end, a lug, and a stop; and a triangular plate on the carriage engaging said lug, substantially as described.

19. In combination with mechanism for winding twine upon a projectile, a guide-arm having a divided and pivoted end, a spring pressing the parts of said end against the opposite sides of the twine, and a hook on said arm to retain the twine, substantially as described.

20. In combination with means for rotating a projectile and securing the ends of twine thereto and severing the same, a movable twine-feeding beak, a spool, oiling mechanism, and a divided guide having one side pivoted, a spring pressing the pivoted side against the twine, and a hook on the fixed side to retain the twine, substantially as described.

21. In combination with a reciprocating carriage, a half-nut on said carriage, a rotative shaft having a thread engaging said nut, a spring to move said carriage, a pivoted arm engaging said carriage and disengaging the nut from the thread, and means for periodically engaging said arm with the carriage, substantially as described.

22. In combination with a reciprocating carriage having a half-nut, a spring to move said carriage one way, a screw-threaded shaft to move said carriage the other way, an arm to lift the carriage out of engagement with the shaft and to form a track for the carriage to run back on, a lug on said arm, and a reciprocating rod having an inclined flange attached to engage said lug, substantially as described.

23. In combination with a reciprocating carriage and a spring and screw-threaded shaft to oppositely move the same, a pivoted arm to lift the carriage out of engagement with the shaft, a lug on said arm, a latch, having notches to engage the arm and hold the same, a reciprocating rod, a plate pivoted in a slot in said rod and having lugs to limit the movement in said slot, an inclined flange on said plate to engage the lug on the arm, and a spring engaging said plate, substantially as described.

24. In combination with a reciprocating carriage, a half-nut, a spring and a screw-threaded shaft to move said carriage, a spring to hold the nut in engagement with the shaft, a pivoted arm to disengage the same and provide a track for the carriage, a notched latch, engaging the movable end of the arm, and engaged and released by the carriage, a lug on the arm, a reciprocating rod having a slot, a plate pivoted in the slot and having lugs to limit its movement, a spring engaging said plate, and an inclined flange on the plate engaging the lug on the arm when moved in one direction, and running over the lug when moved in the other direction, substantially as described.

25. In combination with a reciprocating carriage and a reciprocating spindle, a driving-shaft connected to the spindle, a crank-pin on said shaft, a notched wheel engaged by said pin, a stud on said wheel, a bell-crank lever operated by said stud and connected to said spindle to reciprocate the same, a rod pivoted at one end to said lever, an inclined flange attached to said rod, an arm moved by said flange and engaging the carriage, a latch to hold said arm and released by the carriage, a counter-shaft geared to the driving-shaft and having a screw-thread engaging a half-nut on the carriage, and a spring to return the carriage, substantially as described.

26. The combination of an inclined tube having a lateral extension, a longitudinally-movable spindle traversing said extension, a driving-shaft connected to said spindle, a bell-crank lever attached to the spindle, a wheel having a stud to operate said lever and rotated by the driving-shaft, a reciprocating carriage, a spring to move said carriage, a screw-threaded shaft engaging a half-nut on said carriage and geared to the driving-shaft, a rod connected to the bell-crank lever and having attached an inclined flange, and a pivoted arm operated by said flange to raise the carriage out of engagement with the shaft, a twine-feeding beak on the carriage, spring-actuated hammers to secure and sever the twine, and means for operating said hammers, connected to said carriage, substantially as described.

In testimony whereof I affix my signature in presence of two witnesses.

MYRON C. LISLE.

Witnesses:
LUTHER V. MOULTON,
LEWIS E. FLANDERS.